(12) United States Patent
Ouellette et al.

(10) Patent No.: US 6,250,851 B1
(45) Date of Patent: Jun. 26, 2001

(54) BOTTLE NECK ALIGNMENT MECHANISM FOR AN AIR CONVEYOR

(75) Inventors: Joseph F. Ouellette; Richard J. Ouellette, both of Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/436,861

(22) Filed: Nov. 9, 1999

(51) Int. Cl.[7] .................................................. B65G 53/44
(52) U.S. Cl. ........................ 406/81; 406/79; 198/463.3; 198/468.8
(58) Field of Search ............... 198/463.3, 468.8; 406/79, 81

(56) References Cited

U.S. PATENT DOCUMENTS

| | | | |
|---|---|---|---|
| 3,186,564 | * 6/1965 | Hyer | 214/1 |
| 4,081,991 | * 4/1978 | Powers | 73/41 |
| 4,493,233 | * 1/1985 | Dusel et al. | 83/71 |
| 4,546,526 | * 10/1985 | Dusel et al. | 29/33 |
| 4,705,159 | * 11/1987 | Feliks et al. | 198/468.8 |
| 4,765,452 | * 8/1988 | Johansson | 198/431 |
| 5,100,265 | 3/1992 | Mirkin . | |
| 5,207,311 | * 5/1993 | Terai | 198/419.1 |

* cited by examiner

Primary Examiner—Christopher P. Ellis
Assistant Examiner—Joe Dillon, Jr
(74) Attorney, Agent, or Firm—Howell & Haferkamp, L.C.

(57) ABSTRACT

A bottle neck alignment mechanism precisely horizontally and vertically positions the necks of plastic bottles conveyed by the alignment mechanism from an input conveyor to an output air conveyor where the neck rings of the conveyed plastic bottles are received on guide plates of the air conveyor.

20 Claims, 4 Drawing Sheets

BOTTLE NECK ALIGNMENT MECHANISM FOR AN AIR CONVEYOR

BACKGROUND OF THE INVENTION (1) Field of the Invention

The present invention pertains to a bottle neck alignment mechanism for an air conveyor system of the type that conveys plastic bottles and in particular to an alignment mechanism that precisely horizontally and vertically positions necks of the bottles conveyed into the air conveyor.

(2) Description of Related Art

Air conveyors are used for rapidly transporting plastic bottles or other light weight articles between work stations as, for example, from a blow molding station to a storage station or palletizing station. An example of this type of air conveyor is disclosed in U.S. patent application Ser. No. 08/792,659 filed Jan. 31, 1997 and patented May 16, 2000 as U.S. Pat. No. 6,026,773. This co-assigned application is incorporated herein by reference. A typical air conveyor includes a pair of laterally spaced, parallel flanges that define an elongate, longitudinal slot and a series of air jets on opposite sides of the slot. The plastic bottles are formed with annular rings around their necks. With the bottle necks extending through the slot and the rings overlying the spaced flanges, the bottles are suspended from the flanges and hang below the slot. Pressurized air supplied through an air plenum to the air jets is ejected from the jets and directed in streams toward the bottles. The bottles are pushed through the slot by the force of the air streams directed against the bottles.

Generally, to feed a stream of plastic bottles into the slot of an air conveyor, the bottles are typically placed in their upright orientations on a top surface of an endless belt conveyor. The belt conveyor conveys the bottles to an inlet end of the air conveyor slot. The belt conveyor is positioned so that the necks and rings of the bottles conveyed by the conveyor will align with the inlet end of the conveyor slot with the neck rings being received on the flanges of the conveyor slot. To assist in alignment of the bottle necks and rings with the air conveyor slot as they are transported by the belt conveyor toward the input of the air conveyor slot, the air conveyor is typically provided with a pair of laterally spaced guide plates that project horizontally from the opposite sides of the air conveyor slot toward the belt conveyor and the approaching stream of plastic bottles. The guide plates have mutually opposed edges that are aligned with the opposed edges of the air conveyor flanges at the inlet to the air conveyor slot. The mutually opposed edges of the guide plates diverge away from each other as the guide plates extend from the air conveyor inlet toward the approaching stream of bottles on the belt conveyor. As the bottles are conveyed by the belt conveyor toward the air conveyor slot, their necks pass between the guide plate edges with their annular neck rings positioned just above the horizontal positions of the guide plates. As the bottles are moved closer to the air conveyor slot, the opposed guide plate edges merge toward each other and toward the flanges of the air conveyor slot and work together in aligning the necks of the approaching stream of bottles horizontally, thus aligning the bottle necks with the air conveyor slot. An example of the guide plates that align the bottle necks horizontally relative to the air conveyor slot is disclosed in the co-assigned U.S. Pat. No. 6,026,773, referenced earlier.

The plastic bottles of the type conveyed by the air conveyor described above are the conventional type of plastic bottles used as containers for carbonated beverages and other types of beverages. The plastic bottle has a neck at its top that surrounds an opening of the bottle. The neck typically has exterior screw threading for receiving a cap. As the bottle extends downwardly from the neck, it tapers outwardly to an annular shoulder of the bottle defining the upper portion of the main receptacle or body of the bottle. An outwardly projecting annular rim or ring surrounds the bottle neck separating the neck from the annular shoulder. Plastic bottles of this type are provided in a variety of sizes and configurations.

Plastic bottles of this type are typically manufactured by blow molding. The plastic bottle is blow molded from a plastic parison. When removed from the mold, the plastic blow molded bottle is allowed to cool and at times the cooling of the bottle will result in slight variations in dimensions from one blow molded bottle to the next. This characteristic of blow molded bottles has created problems in the conveying of plastic bottles described earlier, and in particular transferring plastic bottles from a belt conveyor to an air conveyor.

In some designs of plastic bottles, the portion of a plastic bottle between its neck ring and the annular shoulder of the bottle has a very small vertical dimension. In transferring a plastic bottle from a belt conveyor to an air conveyor employing the guide plates described earlier, the plastic bottle must be transferred onto the guide plates so that the annular neck ring of the bottle is received in sliding engagement on top of the guide plates and the guide plates are received in the limited vertical space between the neck ring and bottle shoulder. In the blow molding of bottles, the vertical dimension between the top most edge of the bottle neck and the annular neck ring can be controlled accurately. However, the vertical distance between the bottom surface of the blow molded bottle and the annular neck ring can vary from one bottle to the next, for example by as much as plus or minus $\frac{1}{18}$ of an inch. With such a variation in the vertical positioning of a plastic bottle annular neck ring above the bottom surface of the bottle and the surface of the belt conveyor conveying the bottle to an air conveyor, at times the annular neck ring of a plastic bottle will not align vertically relative to the guide plates of an air conveyor. This often results in the bottle being knocked over on the belt conveyor as it is conveyed toward the air conveyor which can result in disrupting the stream of bottles being conveyed to the air conveyor by the belt conveyor.

What is need to overcome the disadvantages associated with transferring plastic bottles from a belt conveyor to an air conveyor is a way of positively locating the annular neck ring of each plastic bottle in a stream of plastic bottles relative to the flanges of the air conveyor so that the receipt of the annular neck ring of the bottle on the pair of flanges of the air conveyor is assured.

SUMMARY OF THE INVENTION

The disadvantages of prior art belt conveyors transferring a stream of plastic bottles to an air conveyor described above are overcome by the bottle neck alignment mechanism of the present invention. The bottle neck alignment mechanism of the invention is positioned between a belt conveyor conveying bottles in a downstream direction and an air conveyor positioned downstream of the alignment mechanism where it will receive the stream of bottles conveyed by the belt conveyor. The alignment mechanism is basically comprised of pairs of laterally spaced belts and pulleys that are positioned in parallel horizontal planes between the downstream end of the belt conveyor and the upstream end of the air conveyor. The lateral spacing between the pairs of belts and pulleys is adjusted to receive plastic bottles conveyed by the belt conveyor between the laterally spaced belts and pulleys. The belts engage in friction engagement against opposite sides of the plastic bottles conveyed from the belt conveyor and received by the belts and pulleys. Rotation of the pulleys conveys the stream of plastic bottles between the belts from the belt conveyor to the air conveyor.

In addition, a vertical positioning mechanism is located above the pairs of belts and pulleys. The vertical positioning mechanism is comprised of a belt wrapped around a series of pulleys in a vertical plane centered laterally between the horizontally oriented pairs of belts and pulleys. A portion of the vertically oriented belt angles downwardly as it extends from the belt conveyor toward the air conveyor between the pairs of horizontally oriented belts and pulleys. This portion of the vertically oriented belt comes into contact with the tops of the bottle necks conveyed by the pairs of horizontally oriented belts and pulleys and pushes downwardly on the necks causing the bottles to slide vertically downwardly between the belts of the horizontally oriented pairs of belts and pulleys engaging the opposite sides of the bottle. In this manner, the plastic bottles in the stream of bottles conveyed by the horizontally oriented pairs of belts and pulleys are vertically adjusted to a desired position where the bottles will be received by the air conveyor with the annular neck rings of the bottles positioned properly to be received on the pair of flanges of the air conveyor.

To accommodate different sizes of bottles, the pairs of horizontally oriented belts and pulleys are adjustable laterally toward and away from each other and the vertically oriented belt and pulleys are adjustable vertically upward and downward.

BRIEF DESCRIPTION OF DRAWINGS

Further objects and features of the present invention are set forth in the following detailed description of the preferred embodiment of the invention and in the drawing figures wherein.

DETAILED DESCRIPTION OF A PREFERRED EMBODIMENT

Figure 1:
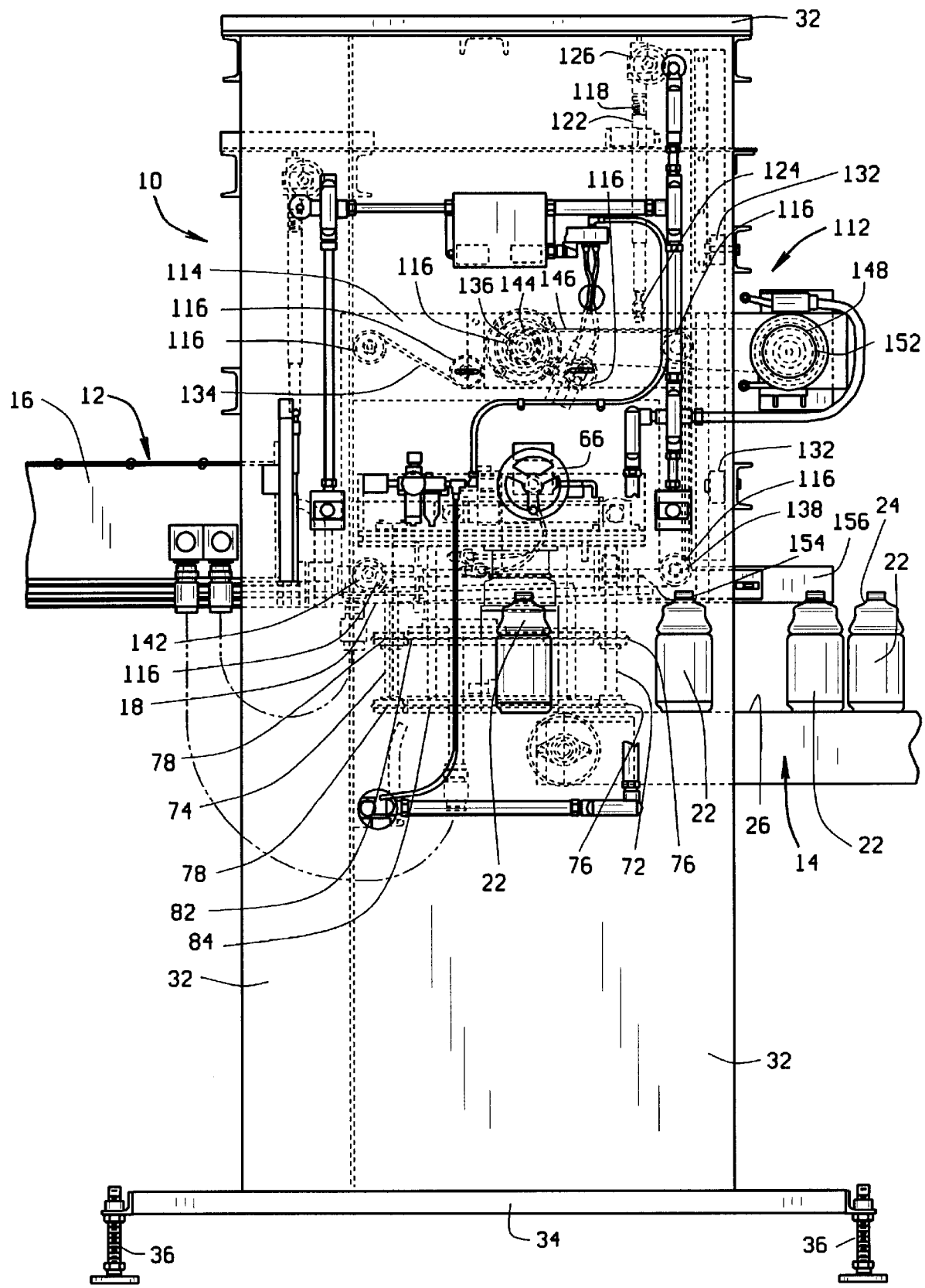
FIG. 1 is a side elevation view of the alignment mechanism of the invention shown positioned between an air conveyor and a belt conveyor.

FIG. 1 shows a side elevation view of the alignment mechanism 10 of the invention. The alignment mechanism 10 is positioned between a typical air conveyor 12 at the left of the alignment mechanism 10 or at a downstream side of the mechanism as shown in FIG. 1, and a typical belt conveyor 14 positioned at the right of the mechanism 10 or at the upstream side of the alignment mechanism shown in FIG. 1.

The air conveyor 12 is of the type disclosed in the earlier reference U.S. Pat. No. 6,026,773, incorporated herein by reference. Like the air conveyor disclosed in the application, it has an air plenum 16 that supplies a flow of air to a plurality of air jets (not shown) arranged along a conveying slot contained in the air conveyor. The air jets push bottles transported into the slot of the air conveyor in the downstream direction, or to the left as viewed in FIG. 1. The air conveyor 12 is provided with a pair of laterally spaced guide plates 18 that receive a flow of plastic bottles from the alignment mechanism 10 and transfer those bottles into the air conveying slot of the conveyor.

The belt conveyor 14 is a typical belt conveyor that conveys a stream of the plastic bottles 22 into the alignment mechanism 10. The bottles 22 are the type having neck rings 24 described earlier. The only requirement of the belt conveyor 14 for proper operation with the alignment mechanism 10 and the air conveyor 12 is that the top conveyor surface 26 of the belt conveyor be positioned so that the neck rings 24 of the bottles conveyed by the conveyor will all be positioned above a horizontal plane defined by the guide plates 18 of the air conveyor 12. Thus, regardless in the variations of the vertical heights of the bottle neck rings 24 above the conveying surface 26 of the belt conveyor 14, the neck rings will all be positioned above the horizontal plane defined by the guide plates 18 of the air conveyor. The height of the belt conveyor surface 26 is such that all the neck rings 24 of the bottles 22 conveyed by the belt conveyor are positioned slightly above the guide plates 18, and only a vertical adjustment of the bottles downwardly is needed by the alignment mechanism 10 to properly position each of the bottles 22 individually prior to their being conveyed onto the guide plates 18 of the air conveyor 12.

The alignment mechanism 10 is supported by an upright metal frame 32 having a base 34 with four feet 36. The frame 32 is positioned in the longitudinal downstream flow path of bottles conveyed by the belt conveyor 14 to the air conveyor 12. As seen in FIG. 1, the downstream end of the belt conveyor 14 projects slightly into the frame 32 and the upstream end of the air conveyor 12 projects slightly into the frame 32.

Figure 2:
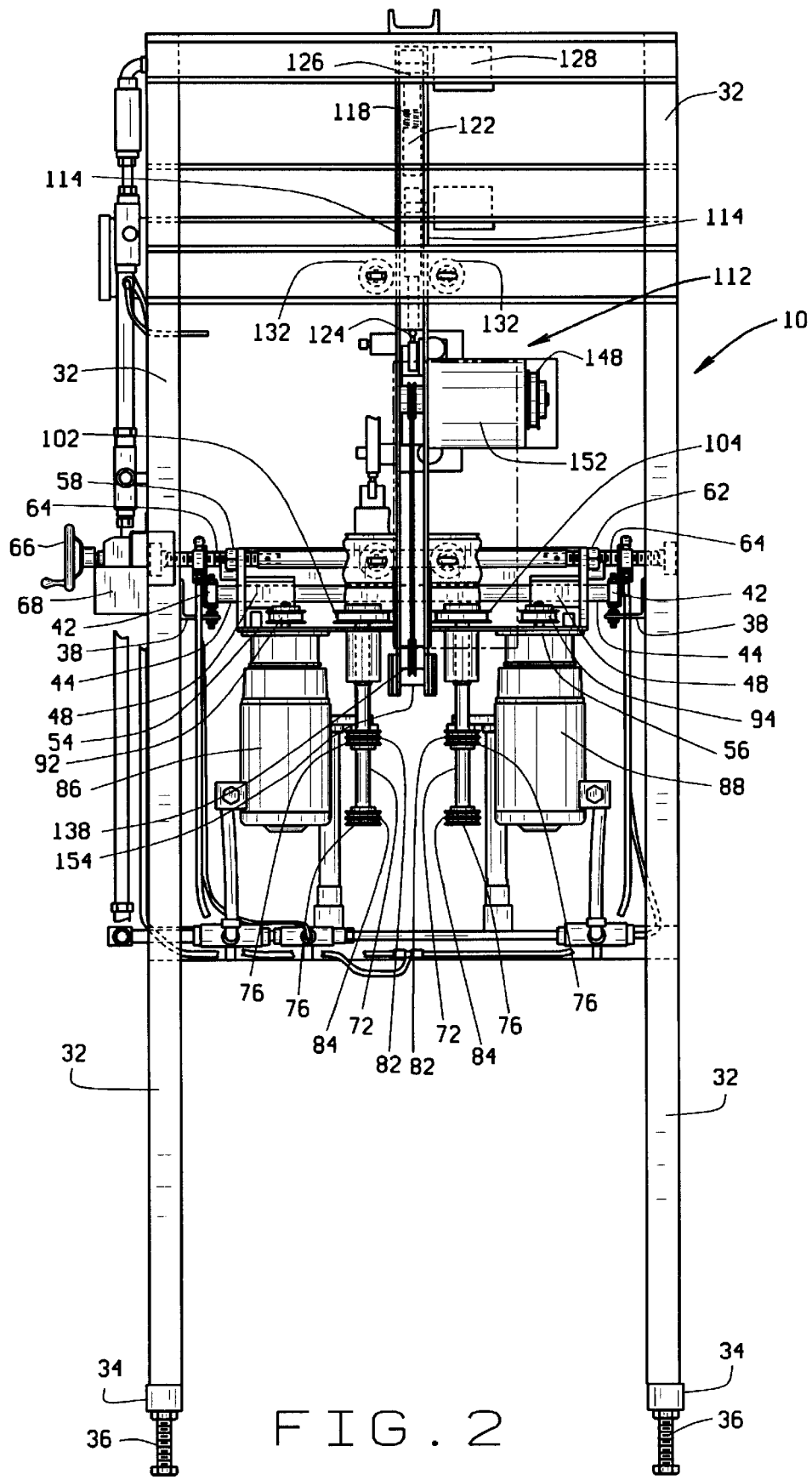
FIG. 2 is an end elevation view of the alignment mechanism of FIG. 1 at the upstream end or the right hand end of the alignment mechanism shown in FIG. 1.
Figure 3:
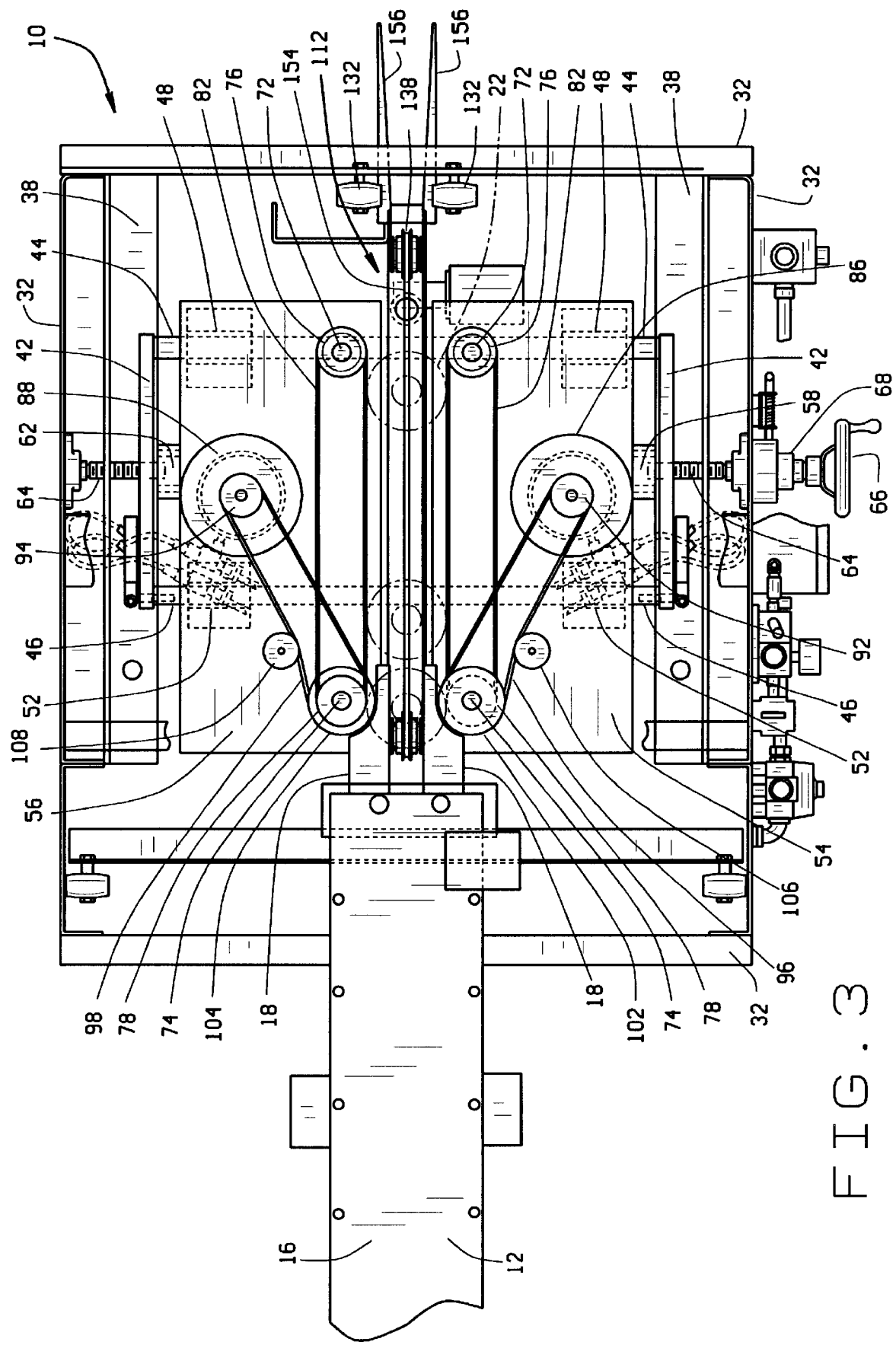
FIG. 3 is a top plan view of the alignment mechanism of FIG. 1.
Figure 4:
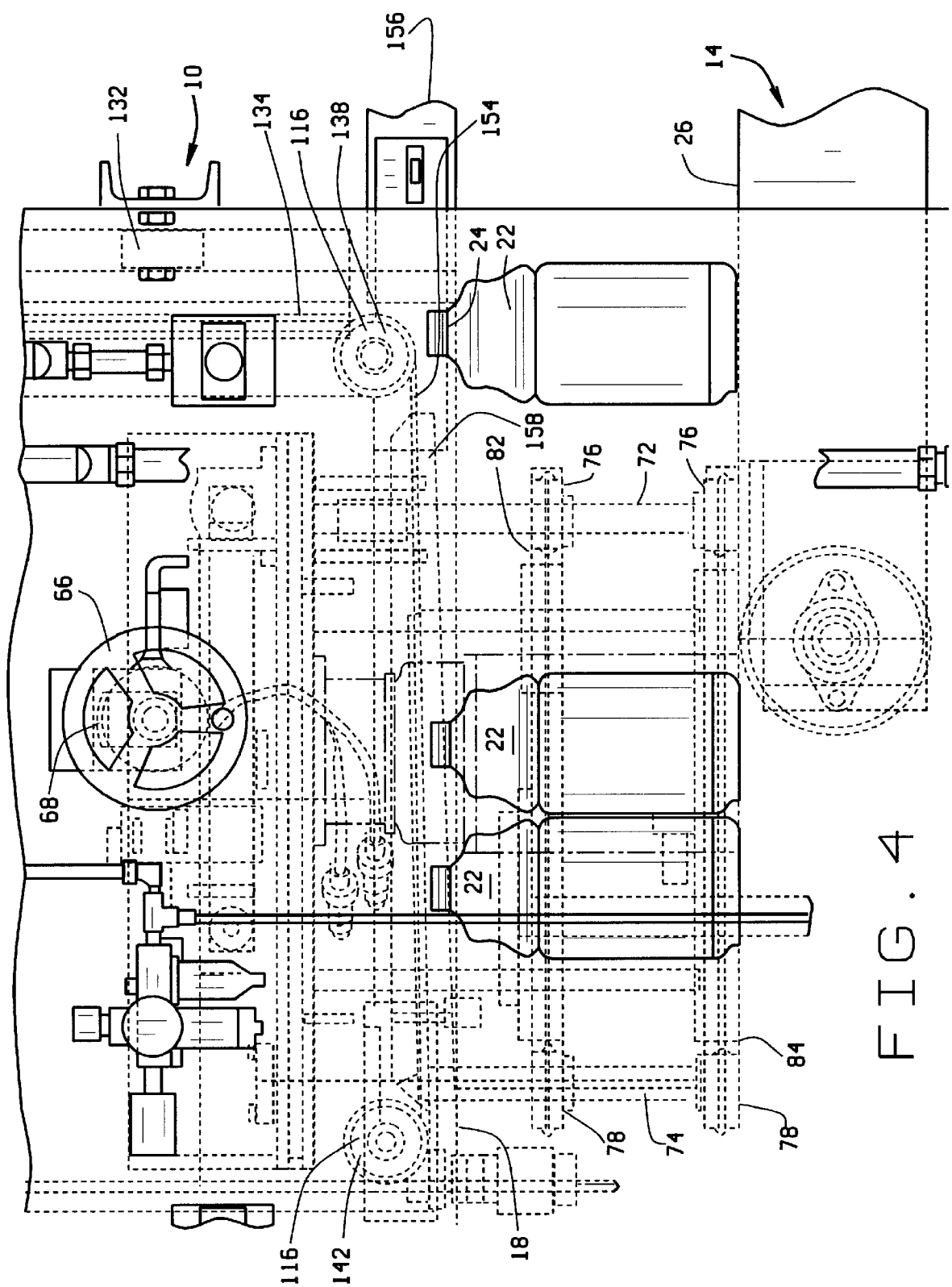
FIG. 4 is an enlarged view of a portion of FIG. 1.

The laterally opposite sides of the frame 32 have longitudinally extending L-shaped members 38 secured thereto, forming a portion of the frame. The L-shaped members 38 are best seen in FIGS. 2 and 3. Mounted on each of the L-shaped members 38 is a horizontal, longitudinally extending mounting bar 42. A pair of slide shafts 44, 46 is mounted between the pair of mounting bars 42 with one slide shaft 44 mounted between the upstream ends of the mounting bars and the second slide shaft 46 mounted between the downstream ends of the mounting bars. Mounted for sliding movement across each of the slide shafts are pairs of slide bushing assemblies 48, 52. The first pair or upstream pair of slide bushing assemblies 48 are mounted adjacent the laterally opposite ends of the upstream slide shaft 44 and the second pair or downstream pair of slide bushing assemblies 52 are mounted adjacent the laterally opposite ends of the downstream slide shaft 46. The slide bushing assemblies are free to slide across their respective slide shafts.

Each of the upstream slide bushing assemblies 48 and the downstream slide bushing assemblies 52 is secured to one of a pair of horizontal, laterally spaced support plates 52, 56. Each of the support plates 54, 56 has a general rectangular configuration and the lateral spacing between the plates defines a longitudinally extending gap that aligns with the slot of the air conveyor 12.

Each of the support plates 54, 56 has an internally screw threaded nut 58, 62 secured thereto. A screw threaded actuator 64 extends laterally across the frame 32 and is secured at opposite ends to the frame for rotation of the screw threaded actuator. In looking at FIG. 2, the screw threading at the opposite left and right hand ends of the screw actuator 64 is opposite. Thus, rotating a hand wheel 66 at the left hand end of the screw threaded actuator 64 will rotate the actuator in the pair of actuator nuts 58, 62 secured to the laterally spaced support plates 54, 56. Because of the opposite screw threading at the opposite ends of the screw threaded actuator 64, rotation of the screw threaded actuator in opposite directions will cause the support plates 54, 56 to slide on their slide bushing assemblies 48, 52 across the pair of slide shafts 44, 46 laterally toward and laterally away from each other. A mechanical counter 68 is mounted on the screw threaded actuator 64 adjacent the hand wheel 66. The counter is calibrated to give a visual indication of the lateral spacing of the gap between the horizontal support plates 54, 56 and opposed pairs of belts beneath the support plates yet to be described when turning the hand wheel in opposite directions and thus adjusting the lateral relative positions of the support plates to each other.

Pairs of shafts 72, 74 are mounted by bearing assemblies on each of the support plates 54, 56. One shaft 72 of each pair is an upstream shaft and the second shaft 74 of each pair is a downstream shaft that is longitudinally spaced from the upstream shaft. Each of the shafts extend vertically downward below the support plates as shown in FIGS. 1 and 2. The upstream shafts 72 each have pairs of vertically spaced upstream pulleys 76 mounted thereon and the downstream shafts 74 each have pairs of vertically spaced downstream pulleys 78 mounted thereon. The upper pulleys on the four shafts are all mounted in the same horizontal plane and the lower pulleys on the four shafts are all mounted in the same horizontal plane. Pairs of belts 82 extend between the upper, upstream pulleys 76 and the upper, downstream pulleys 78 and pairs of belts 84 extend between the lower, upstream pulleys 76 and the lower, downstream pulleys 78. The upper belts 82 are both positioned in the same horizontal plane and extend longitudinally downstream, generally parallel to each other. The lower belts 84 are also both positioned in the same horizontal plane and extend longitudinally downstream, generally parallel to each other. It can be seen in FIG. 2 that the upper pair of belts 82 and the lower pair of belts 84 each define opposed friction surfaces that extend in the downstream direction from the input belt conveyor 14 to the output air conveyor 12. The lateral spacing between the belts can be adjusted by the screw threaded actuator 64.

The belt and pulley drives that extend between the upstream pulleys 76 and the downstream pulleys 78 are powered by a pair of electric motors 86, 88 that are mounted to the horizontal support plates 54, 56. Each of the motors 86, 88 has a drive gear belt pulley 92, 94 that is connected by a gear belt 96, 98 to a driven gear belt pulley 102, 104 that is mounted to the top of each of the downstream shafts 74 above their respective support plates 54, 56. Idler pulleys 106, 108, one mounted on each of the support plates 54, 56, take up slack in the gear belts 96, 98. Thus, operation of the electric motors 86, 88 in opposite directions will move the mutually opposed friction surfaces of the upper belts 82 and the lower belts 84 in the downstream direction from the belt conveyor 14 toward the air conveyor 12. A bottle delivered by the belt conveyor 14 into the adjustment mechanism 10 will be gripped between the friction surfaces of the upper pair of belts 82 and the lower pair of belts 84 and conveyed off of the top surface 26 of the belt conveyor and across the alignment mechanism 10 to the air conveyor 12 where the neck ring 24 of the bottle will be received on the guide plates 18 of the air conveyor.

As bottles delivered by the belt conveyor 14 to the pairs of upper belts 82 and lower belts 84 are conveyed toward the air conveyor 12, a vertical positioning mechanism 112 adjusts the vertical positions of the bottles between the opposed pairs of belts 82, 84 so that the neck ring 24 of the conveyed bottle will be received on top of the guide plates 18 as the conveyed bottle reaches the air conveyor 12. The vertical positioning mechanism 112 is comprised of a pair of laterally spaced, vertically oriented plates 114 having a plurality of pulleys 116 mounted for rotation between the plates. As seen in FIG. 2, all of the pulleys 116 are positioned in the same vertical plane that bisects the gap between the horizontal support plates 54, 56. The pair of vertical plates 114 on the opposite sides of the pulleys 116 project downwardly between the horizontal support plates 54. The vertical support plates 114 are suspended by a vertical commercially available adjustment mechanism that includes an externally screw threaded rod 118 that is received in an internally screw threaded sleeve 122 secured to the frame 32. The bottom most end of the rod 118 is secured to the vertical support plates 114 by a ball and socket connection 124. The upper end of the adjustment rod 118 is operatively connected through a transmission 126 to an electric motor 128 that is controlled to selectively rotate the adjustment rod 118 in opposite directions of rotation. The opposite directions of rotation of the rod 118 in the sleeve 122 cause the rod to be selectively moved upwardly and downwardly relative to the sleeve, thus moving the pair of vertical support plates 114 of the vertical positioning mechanism selectively upwardly and downwardly. Pairs of rollers 132 mounted on the frame and seen in FIGS. 1 and 2 maintain the parallel plates 114 of the vertical positioning mechanism in their vertically upright orientations as their vertical position relative to the frame is adjusted.

A continuous belt 134 is wrapped around the pulleys 116 of the vertical positioning mechanism including a drive pulley 136, and an upstream positioning pulley 138 and a downstream positioning pulley 142 at the bottom of the positioning mechanism. The drive pulley 136 is mounted on a shaft with a driven gear belt pulley 144 that is operatively connected by a gear belt 146 with a drive gear belt pulley 148. The drive gear belt pulley 148 is mounted on the shaft of a motor 152 secured to the vertical positioning mechanism 112. All three motors 86, 88, 152 have air operated brake/clutches for rapid start up and stopping. Operation of the motor 152 causes the belt 134 to move about the plurality of pulleys 116 and in particular causes a section of the belt 154 between the upstream positioning pulley 138 and the downstream positioning pulley 142 to move in a downstream direction from above the belt conveyor 14 toward the air conveyor guide plates 18. As seen in FIG. 1, the upstream positioning pulley 138 is positioned slightly vertically above the downstream positioning pulley 142. Therefore, the section of the belt 154 that extends between the upstream positioning pulley 138 and the downstream positioning pulley 142 angles slightly downwardly as it extends downstream.

The vertical position of the upstream positioning pulley 138 when the vertical positioning mechanism 112 is properly vertically adjusted for a given size of bottles is slightly above the bottles as the belt conveyor 14 conveys the bottles into the alignment mechanism 10. As the belt conveyor 14 feeds the stream of bottles into the alignment mechanism 10 a pair of tapered arms 156 engage against the opposite lateral sides of the bottle neck ring and centers the bottle relative to the alignment mechanism 10 where the top of the bottle spout will be aligned with the belt 134 of the vertical positioning mechanism. As the belt conveyor 14 conveys the bottles into the alignment mechanism 10 the stream of bottles are transferred from the belt conveyor 14 to the pairs of upper belts 82 and pairs of lower belts 84 which are adjusted laterally for the particular bottles to engage in friction engagement against the laterally opposite sides of the bodies of the bottles. Thus, the upper belts 82 and lower belts 84 hold the bottles in friction engagement between them as they convey the bottles from the belt conveyor 14 toward the air conveyor 12.

As the bottles are conveyed by the upper belts 82 and the lower belts 84, the vertical positioning belt section 154 between the upstream positioning pulley 138 and the downstream positioning pulley 142 gradually comes into contact with the tops of the bottle spouts as they are conveyed toward the air conveyor 12 and the air conveyor guide plates 18. An inverted U-shaped channel guide 158 covers the vertical positioning belt section 154 and the annular ring of the conveyed bottles to keep the bottle spout centered relative to the vertical positioning belt section. The vertical positioning belt section 154 pushes downwardly on the bottle spouts as they are conveyed downstream and causes the bodies of the bottles to slide downwardly between the upper belts 82 and the lower belts 84 as they are continued to be conveyed toward the air conveyor 12 and the air conveyor guide plates 18. Because the distance between the top of the bottle spout and the bottle neck ring 24 can be more accurately controlled than the distance between the bottom of the bottle and the bottle neck ring, the vertically downward adjusting movement of the bottles conveyed between the upper belts 82 and lower belts 84 made by the vertical positioning belt section 154 of the accurately positions the neck rings 24 of the bottles to be received in sliding engagement on top of the guide plates 18 of the air conveyor 12 as the bottles are transferred to the air conveyor by the alignment mechanism 10. In this manner, the alignment mechanism 10 precisely horizontally and vertically positions the neck rings of the bottles conveyed through the mechanism from an upstream conveyor to a downstream conveyor.

While the present invention has been described by reference to a specific embodiment, it should be understood that modifications and variations of the invention may be constructed without departing from the scope of the invention defined in the following claims.

What is claimed:

1. An apparatus for vertically positioning a conveyed object, the apparatus comprising:
   an input conveyor that conveys objects in a longitudinal, downstream direction;
   a pair of laterally spaced friction surfaces positioned downstream of the input conveyor where objects conveyed in the downstream direction by the input conveyor will be moved between and held in friction engagement between the pair of laterally spaced friction surfaces; and
   a vertical positioning mechanism positioned above the pair of laterally spaced friction surfaces where the vertical positioning mechanism will engage with objects held in friction engagement between the pair of laterally spaced friction surfaces and push the objects vertically downward sliding the objects between the pair of laterally spaced friction surfaces by being brought into engagement with said mechanism by said surfaces and thereby adjusting vertical positions of the objects relative to the pair of laterally spaced friction surfaces.

2. The apparatus of claim 1, wherein: the pair of laterally spaced friction surfaces conveys objects received from the input conveyor in the downstream direction away from the input conveyor and into engagement with the vertical positioning mechanism.

3. The apparatus of claim 2, wherein:
   an output conveyor is positioned downstream of the pair of laterally spaced friction surfaces where objects conveyed in the downstream direction by the pair of laterally spaced friction surfaces will be received by the output conveyor and conveyed away from the pair of laterally spaced friction surfaces.

4. The apparatus of claim 3, wherein:
   the output conveyor is an air conveyor.

5. The apparatus of claim 1, wherein:
   the pair of laterally spaced friction surfaces are adjustable laterally toward and away from each other.

6. The apparatus of claim 1, wherein:
   the pair of laterally spaced friction surfaces are adjustable vertically upward and downward.

7. The apparatus of claim 1, wherein:
   the pair of laterally spaced friction surfaces are simultaneously adjustable vertically upward and downward.

8. The apparatus of claim 1, wherein:
   each laterally spaced friction surface is a surface of a belt supported on at least a pair of longitudinally spaced wheels that rotate about parallel axis.

9. The apparatus of claim 8 wherein:
   the wheels are pulleys.

10. The apparatus of claim 8, wherein:
    the vertical positioning mechanism is a second belt supported on at least one pair of longitudinally spaced, second wheels that rotate about parallel axes.

11. The apparatus of claim 10, wherein:
    the axes of the wheels of each laterally spaced friction surface are perpendicular to the axes of the second wheels.

12. The apparatus of claim 10, wherein:
    the second wheels are centered laterally relative to the pair of laterally spaced friction surfaces.

13. A apparatus for vertically positioning a conveyed object, the apparatus comprising:
    a first belt guided by a first pair of pulleys, the pulleys of the first pair of pulleys being longitudinally spaced from each other;
    a second belt guided by a second pair of pulleys, the pulleys of the second pair of pulleys being laterally spaced from each other, the second belt being laterally spaced from the first belt whereby objects are held between the first and second belts and conveyed in a longitudinal downstream direction; and
    a vertical positioning mechanism positioned above the first and second belts where the vertical positioning mechanism will engage with objects held between the first and second belts and push the objects vertically downward sliding the objects between the first and second belts as the objects are conveyed in the longitudinal direction, by being brought into engagement with said mechanism by said belts thereby adjusting vertical positions of the objects relative to the first and second belts.

14. The apparatus of claim 13, wherein:
    the first pair of pulleys and the second pair of pulleys are laterally adjustable toward and away from each other.

15. The apparatus of claim 13, wherein:
    the first pair of pulleys and the second pair of pulleys are vertically adjustable relative to the vertical positioning mechanism.

16. The apparatus of claim 13, wherein:

an output conveyor is positioned downstream of the first and second belts where objects conveyed in the downstream direction by the first and second belts will be received by the output conveyor and conveyed away from the first and second belts.

17. The apparatus of claim 13, wherein:

the first pair of pulleys and the second pair of pulleys all have parallel axes of rotation.

18. The apparatus of claim 17, wherein:

the vertical positioning mechanism includes a third belt guided by a third pair of pulleys, the pulleys of the third pair of pulleys being longitudinally spaced from each other, the third belt being positioned above the first and second belts where it will engage with objects held between the first and second belts and push the objects vertically downward sliding the objects between the first and second belts as the objects are conveyed in the longitudinal direction.

19. The apparatus of claim 18, wherein:

the third pair of pulleys have axes of rotation that are perpendicular to the axes of rotation of the first and second pairs of pulleys.

20. The apparatus of claim 19, wherein:

the axis of one pulley of the third pair of pulleys is positioned vertically below the axis of the other pulley of the third pair of pulleys.

\* \* \* \* \*